United States Patent [19]
Wagenseil et al.

[11] Patent Number: 4,519,413
[45] Date of Patent: May 28, 1985

[54] PRESSURE AVERAGER

[75] Inventors: Ludwig Wagenseil, Vohringen; Hermann Hoffmeister, Nersinger, both of Fed. Rep. of Germany

[73] Assignee: Hydromatik GmbH, Elchingen, Fed. Rep. of Germany

[21] Appl. No.: 593,617

[22] Filed: Mar. 26, 1984

[30] Foreign Application Priority Data

Mar. 24, 1983 [DE] Fed. Rep. of Germany ....... 3310791

[51] Int. Cl.[3] ................................................ F15C 3/02
[52] U.S. Cl. .................................... 137/111; 137/112; 235/200 PF; 417/286
[58] Field of Search ............... 137/111, 112, 113, 503; 417/286; 60/593; 235/200 R, 200 PF

[56] References Cited

U.S. PATENT DOCUMENTS

| | | | |
|---|---|---|---|
| 1,581,454 | 4/1926 | Larson | 137/503 X |
| 2,870,776 | 1/1959 | Marsh | 137/111 X |
| 3,150,675 | 9/1964 | Phillips | 137/85 |
| 3,962,954 | 6/1976 | Jacob et al. . | |

FOREIGN PATENT DOCUMENTS 2406573 8/1974 Fed. Rep. of Germany .

OTHER PUBLICATIONS

"Pneumatic Computer", pp. 76–77, *Control Engineering*, Oct. 1954.

*Primary Examiner*—Alan Cohan
*Assistant Examiner*—Stephen M. Hepperle
*Attorney, Agent, or Firm*—Scully, Scott, Murphy & Presser

[57] ABSTRACT

The invention relates to a pressure averager for providing an averaged working pressure from the operating pressures of at least two sources of pressure medium, there being provided to average the operating pressures a differential piston of which the number of step faces which face the same direction and which are of equal size corresponds to the number of operating pressures to be averaged, of which the oppositely directed working face is equal to the sum of the step faces, and which is displaceably guided in a correspondingly stepped housing which is provided with supply lines for the operating pressures, and its object is to develop the pressure averager in such a way that an additional pressure relief valve is not required for its function within a hydraulic installation. This is achieved in that annular grooves in each case associated with a control edge of the respective step faces are provided in the housing, and in that leading away from the annular grooves there are discharge lines which are connected to a common line for the averaged pressure which is connected in turn to the working face.

4 Claims, 3 Drawing Figures

PRESSURE AVERAGER

TECHNICAL FIELD OF INVENTION

The invention relates to a pressure averager of the type described in the pre-characterizing part of claim 1.

BRIEF DESCRIPTION OF THE PRIOR ART

A pressure averager of this construction is shown and described in German OLS No. 24 06 573. The known pressure averager has a housing in which a two-step stepped or differential piston is guided. The differential piston divides the housing into three working chambers of which those associated with the step faces are each acted upon by the working pressure of a hydraulic pump, while the pressure being established in the working chamber associated with the total working face is used for pressure regulation and control respectively.

As the step faces which face in the same direction are of an equal size and the oppositely directed working face (total working face) is equal to the sum of the step faces, an average pressure $p_m$ is produced in the working chamber associated with the total working face when the pressure averager is operating, for which the following relationship applies:

$$p_m=(p_1+p_2)/2$$

In the known pressure averager the working chamber associated with the total working face is connected to a pressure limiting or pressure relief valve by a hydraulic line for the purposes of adjusting pressure in the hydraulic system. This constitutes an important disadvantage because the known pressure averager acts only indirectly and thus a special pressure relief valve has to be provided.

OBJECT OF THE INVENTION

The underlying object of the invention is to design a pressure averager constructed in the way initially specified, so that it requires no additional pressure relief valve for its operation inside a hydraulic installation.

SUMMARY OF THE INVENTION

The object is achieved according to the invention by a pressure averager having the features of claim 1.

The advantage achieved by the invention is shown by comparison with the prior art in that there is a hydraulic connection throttled in the pressure averager between the working circuits of the pumps and the line containing the averaged pressure. As a result there is no need for an additional pressure relief valve, as the line containing the averaged pressure can be connected directly to the hydraulic system.

According to the developments according to claims 2 and 3, the pressure medium is prevented from overflowing from one circuit into another in order to prevent power losses at different operating pressures, which ensures a reliable, loss-free operation of the pressure averager. Thus, the operating pressures of several sources of pressure medium can be averaged in the most accurate and reliable manner. For example, the operating pressures of several hydraulic pumps can be conducted, already averaged, in only one supply line to a further element which previously received the various pressures via several supply lines and had additionally to be constructed in order to be able to average the pressures. According to claim 2 the above-mentioned aim is achieved by a non-return valve being disposed in each discharge line. According to claim 3, a non-return valve is integrated in the throttle. In this solution the control edge of at least one of the step faces is formed on an annular piston which is mounted between the differential piston and the housing with axial freedom of movement between two stops on the differential piston. As a result of the possibility of relative displacement of the annular piston and the differential piston, an overlap is produced changeably at the control edges in dependence upon the pressure which blocks the return flow of the pressure fluid from the average pressure side to the low pressure side.

A simple design and a low surface pressure on the stop faces are achieved by the advantageous use of annular shoulders for the stops.

The pressure averager according to the invention has the great advantage of helping to simplify complex hydraulic elements. Also, it offers the advantage that a component, designed for operation with only one operating pressure, can now be supplied with operating pressures from several pressure sources, as, through the pressure averager, the working pressure is supplied through only one supply line. Thus, for example, a regulator which in the past could only be used for regulating a single feed pump can be used, by the interconnection of the pressure averager according to the invention, for regulating two or more feed pumps simultaneously.

The invention enables the known pressure averager, which is of a complex construction and requires an additional pressure relief valve for its operation, to be simplified in practice in terms of its construction to a single-acting cylinder.

BRIEF DESCRIPTION OF THE DRAWINGS

Two exemplary embodiments of the invention are explained in more detail in the following with reference to the attached diagrammatic drawings, in which.

DETAILED DESCRIPTION OF THE PREFERRED EMBODIMENT OF THE INVENTION

Figure 1:
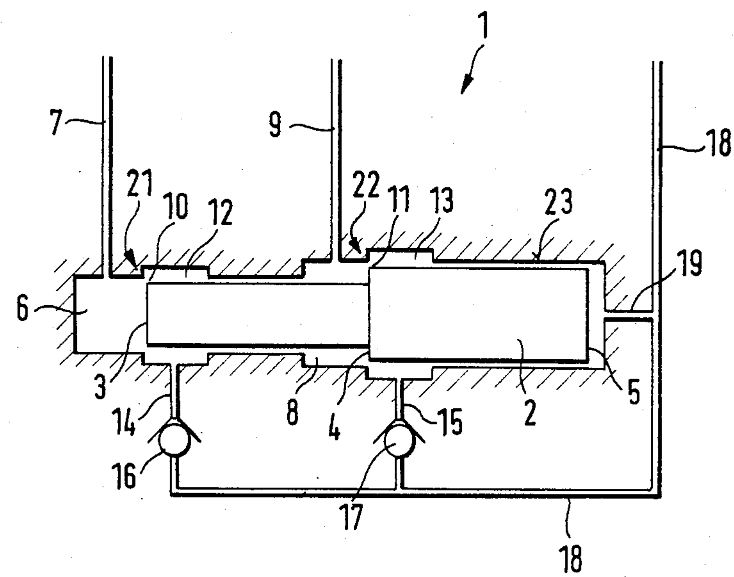
FIG. 1 shows in section a pressure averager as a first exemplary embodiment.

The pressure averager, designated as a whole by 1, has a differential piston 2, the two step faces 3 and 4 of which, which face in the same direction, are of equal size. The working face 5 disposed in the opposite direction to the step faces 3 and 4 has a surface area which is equal to the sum of that of the two step faces 3 and 4. The differential piston 2 is arranged in a housing of which only the inner working chambers are shown. Thus, the housing has a first working chamber 6 discharging into which is a supply line 7 with a first operating pressure $p_1$. In addition, a second working chamber 8 is provided, connected to which is a supply line 9 with the second operating pressure $p_2$. An annular groove 12, 13 respectively is associated with each of the two working chambers 6 and 8 and the control edges 10 and 11 of the step faces 3 and 4 respectively. The control edges 10 and 11 thus each co-operate with an edge of the annular grooves 12, 13 respectively. A discharge line 14, 15 respectively leads away from each of the annular grooves 12 and 13. A non-return valve 16, 17 respectively is arranged in each of the discharge lines 14 and 15. Both discharge lines 14 and 15 are joined by a line 18 from which in turn a branch 19 leads to the working surface 5.

The control edges 10, 11 form, in each case with one edge of the appertaining annular groove 12, 13 respectively, throttles which are designated by 21 and 22. The housing is designated by 23.

The pressure averager according to the invention operates as follows:

If the operating pressures $p_1$ and $p_2$, for example from two feed pumps, are supplied via the supply lines 7 and 9 to the pressure averager 1, these pressures act upon the step faces 3, 4 respectively of the differential piston 2. They will move the differential piston to the right to the stop, so that the control edges 10, 11 respectively of the annular grooves 12, 13 respectively are completely freed. Thus, the pressure medium may enter the discharge lines 14, 15 respectively and reach the line 18 via the non-return valves 16 and 17.

If the two operating pressures are of the same magnitude, i.e. $p_1=p_2$, the pressure $p_1=p_2$ will build up in the line 18 via the branch 19 at the working face 5. In this way equal forces act on both sides of the piston. The right-hand stop position of the piston is consequently the equilibrium position when the operating pressures are identical, as the averaged pressure is simultaneously identical to the respective operating pressures.

However, should one of the two operating pressures be higher than the other, the equilibrium position of the differential piston 2 will change. If, for example, the pressure $p_2$ is greater than the pressure $p_1$ then, after the differential piston 2 has been pushed into its right-hand stop position, the pressure medium with the higher pressure $p_2$ will, after it passes through the discharge line 15, pass both into the line 18 and also into the low-pressure discharge line 14. In this way the non-return valve 16 is closed and the pressure $p_2$ will act on the working face 5. As the higher pressure $p_2$ now acts on the total face, the propelling force produced at this side and acting to the left becomes greater than the propelling force to the right caused by the pressures $p_1$ and $p_2$ at the small step faces. The differential piston 2 is consequently moved to the left until the control edge 11 of step face 4 throttles the flow of fluid with the pressure $p_2$ until the equilibrium of the forces is re-established. This equilibrium is reached when the operating pressures are averaged, i.e. when $$p_m=(p_1+p_2)/2$$

Consequently, the differential piston 2 will throttle the flow of fluid to a greater or lesser degree or release it completely according to the difference in each case between the two operating pressures $p_1$ and $p_2$. However, it will always be able to assume a position of equilibrium so that the operating pressure contained in line 18 will be the exactly averaged pressure $p_m$ from the operating pressures $p_1$ and $p_2$.

As already mentioned above, the pressure averager may also be designed, in the same way as described for two operating pressures with reference to the drawing, for the operating pressures of more than two sources of pressure medium. Irrespective of how many supply lines and discharge lines respectively and thus, by association, of how many steps the differential piston has, the arithmetical average will be obtained in each case of all the operating pressures supplied and acting at the step faces facing in the same direction, i.e. the operating pressure $$p_m=(p_1+p_2+\ldots+p_n)/n$$

The differential piston 2 is always pushed into its position of equilibrium so that the various operating pressures act in equilibrium on the various equally sized faces and, via the control edges and non-return valves, on the sum or working surface.

Figure 2:
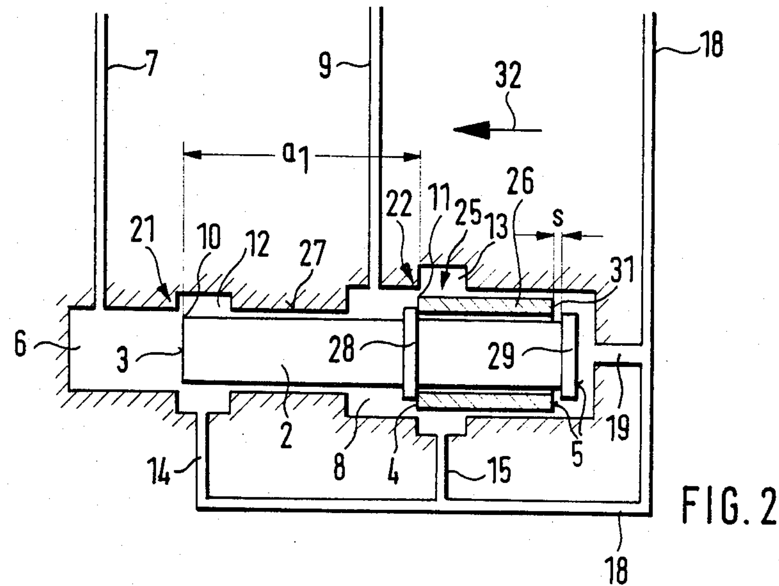
FIG. 2 shows in section a pressure averager as a second exemplary embodiment.

In the second exemplary embodiment according to FIG. 2, in which the same components are given the same reference numerals, a non-return valve, designated generally by 25, is also provided. The non-return valve 25 is integrated with the differential piston 2 and the throttle 22 respectively. It consists of an annular piston 26 coaxially enclosing the differential piston 2 and which is mounted in a sealing manner between the differential piston 2 and the housing designated here by 27, and is axially displaceable between two stops 28, 29 on the differential piston 2. The stops 28, 29 are formed by annular shoulders of the differential piston 2. The clearance for movement, which has still to be explained, is designated by s. The end face of the annular piston 26 facing the throttle 22 forms the step face 4 and the control edge 11.

The position of the differential piston 2 and the annular piston 26 represented in FIG. 2 is assumed during the operation of the pressure averager when the operational pressure $p_1$ in the supply line 7 is greater than the operational pressure $p_2$ in the supply line 9. In this case, a greater pressure acts at the end face 31 of the annular piston 26 facing the working face 5 than at the end face of the annular piston 26 facing the throttle 22, namely the step face 5 ($p_m>p_2$). As a result, the annular piston 26 is acted upon in the direction of the throttle 22 (arrow 32) and abuts the left stop 28. In this limit position the throttle 22 is closed while throttle 21 is regulating. Thus, the pressure $p_m$ cannot reach the supply line 9 and it acts at the working surface 5 of the differential piston 2.

Figure 3:
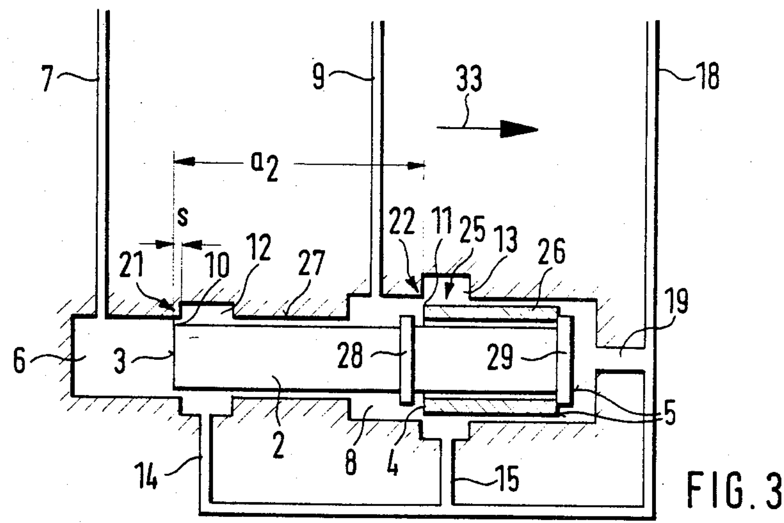
FIG. 3 shows the second exemplary embodiment in another operating position.

The differential piston 2 and the annular piston 26 assume the position represented in FIG. 3 when the pressure $p_2$ in the supply line 9 is greater than the pressure $p_1$ in the supply line 7. The annular piston 26 is thus acted upon in the direction of the arrow 33 so that it abuts the stop 29, because $p_2$ is greater than $p_m$. In this operational position the throttle 22 (control edge 11) is regulating while throttle 21 is closed, because, in comparison with the position in the operating position according to FIG. 2, the differential piston 2 has been displaced by the movement clearance s towards throttle 21, thus it closes the throttle as can be seen clearly in the drawing.

The movement clearance s is dimensioned such that, in comparison with the control edge 11 of the first exemplary embodiment, the control edge 11 can be moved in both axial directions so far that it is able to close the throttle 22 in the regulating position of the throttle 21 (FIG. 2) and, in its own regulating position (FIG. 3), the differential piston 2 may close the throttle 21. The displaceability of the annular piston 26 and thus of the control edge 11 and the displaceability of the annular piston 26 and of the differential piston 2 with respect to each other changes the distance $a_1$, $a_2$ respectively of the two control edges 10, 11 as a function of the respective pressure ratio $p_m/p_1$, $p_m/p_2$ respectively. The distance $a_2$ being established in the operating position according to FIG. 3 is greater by the movement clearance s than the distance $a_1$ occurring in the operating position according to FIG. 2. The overlap thus occurring alternately at the control edges 10, 11 blocks the return flow of pressure fluid from the average pressure side (line 18) to the low pressure side (supply line 7, 9 respectively).

When the pressure $p_1$ and the pressure $p_2$ are of equal magnitude, the annular piston 26 acts as a pressure balance, and acts upon both sides (step face 4, end face 31) with equal pressures ($p_1=p_2=p_m$). The annular piston 26 assumes a position between the stops 28, 29 which is self-adjusting, so that the throttle cross sections of the throttles 21, 22 are adapted to each other.

If, with a differential piston 2 having more than two steps, several annular pistons 26 are present, a connecting line (not represented) is required in each case between the line 18 and the housing 27 in order that the end face 31 of the annular piston 26 facing away from the appertaining throttle is acted upon by the averaged pressure. In the exemplary embodiment according to FIGS. 2 and 3 such a line is not required because the end face 31 is located at the end of the differential piston 2 and thus is automatically acted upon by the averaged pressure.

What is claimed is:

1. A pressure averager for providing an averaged working pressure from the operating pressure of at least two sources of pressure medium, more particularly hydraulic pumps, there being provided to average the operating pressures a differential piston of which the number of step faces which face in the same direction and which are of equal size corresponds to the number of operating pressures to be averaged, of which the oppositely directed working face is equal to the sum of the step faces, and which can be displaceably guided in a correspondingly stepped housing that is provided with supply lines for the operating pressures, characterized in that annular grooves in each case associated with a control edge of the respective step faces are provided in the housing, and in that leading away from the annular grooves there are discharge lines which are connected to a common line for the averaged pressure which is connected in turn to the working face.

2. A pressure averager according to claim 1, characterized in that in order to prevent power losses at different operating pressures, a non-return valve is arranged in each discharge line.

3. A pressure averager according to claim 1, characterized in that at least one of the step faces and the associated control edge is formed on an annular piston which is mounted displaceably between the differential piston and the housing with axial freedom of movement between two stops on the differential piston, wherein the freedom of movement allows displacement of the annular piston in both axial directions from a normal position prescribed by a throttle formed by the associated annular groove, and wherein the end face of the annular piston which is remote from the throttle can be acted upon by the averaged pressure.

4. A pressure averager according to claim 3, characterized in that the stops are formed by annular shoulders of the differential piston.

* * * * *